David G. Fladlien
J Perry Smith
INVENTORS

David G. Fladlien
J Perry Smith
INVENTORS

BY

*Donald W. Graves*

ATTORNEY

United States Patent Office 3,422,689
Patented Jan. 21, 1969

3,422,689
TUNING DEVICE FOR ADJUSTING A MIRROR FOR A LASER
David G. Fladlien, Los Angeles, and J Perry Smith, Hawthorne, Calif., assignors to TRW Inc., Redondo, Beach, Calif., a corporation of Ohio
Filed Mar. 29, 1967, Ser. No. 626,841
U.S. Cl. 74—89.15     4 Claims
Int. Cl. F16h 27/02; H01s 3/00

ABSTRACT OF THE DISCLOSURE

A tuning mechanism is employed for adjusting a mirror on a laser. The mechanism operates to focus the mirror about its center rather than another point. Two rotatable knobs are provided which, when rotated, will adjust the mirror to its desired position.

Background of the invention

In recent years lasers have come into their own as useful devices. One type of laser is the gas ion laser in which mirrors are provided at each end of the laser cavity. In such a device there is a need for finally positioning the mirrors. This is required because there must be a proper alignment to allow the coherent beam to develop and be emitted.

One structure for accomplishing the mirror adjustment is disclosed in the U.S. patent application, Ser. No. 569,365, filed on Aug. 1, 1966, and assigned to the assignee of this invention. However, the mirror in that patent application, when being adjusted, is subject to a change in laser cavity length. This is due to the axial shifting of the lens center during adjustment.

In the U.S. patent to Rempel, No. 3,204,471, there is disclosed a coarse and fine adjustment for a laser mirror. The device, however, is complex and requires many parts.

Brief summary

The invention may be summarized as a device for adjusting an object such as a mirror or lens about a predetermined point with a longitudinal beam supporting the object. A first lever and a rotatable element is adapted to move the beam in a horizontal plane while a second lever and rotatable element is adapted to move the beam in a vertical plane.

Brief figure description

Figure 1:
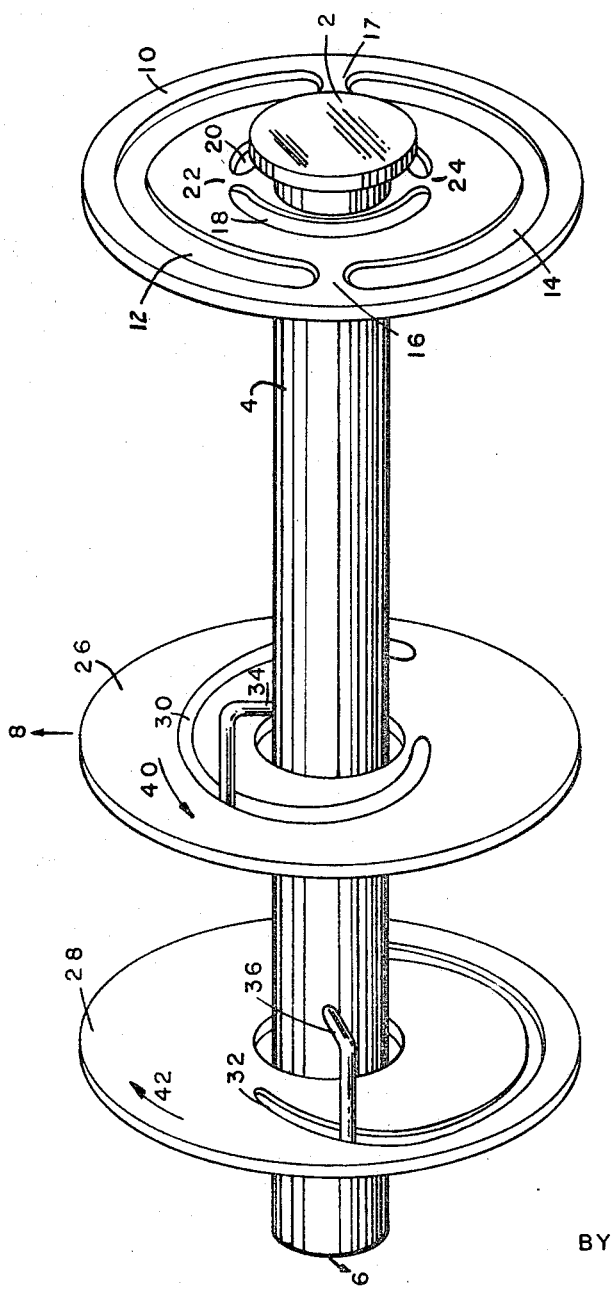
Figure 2:
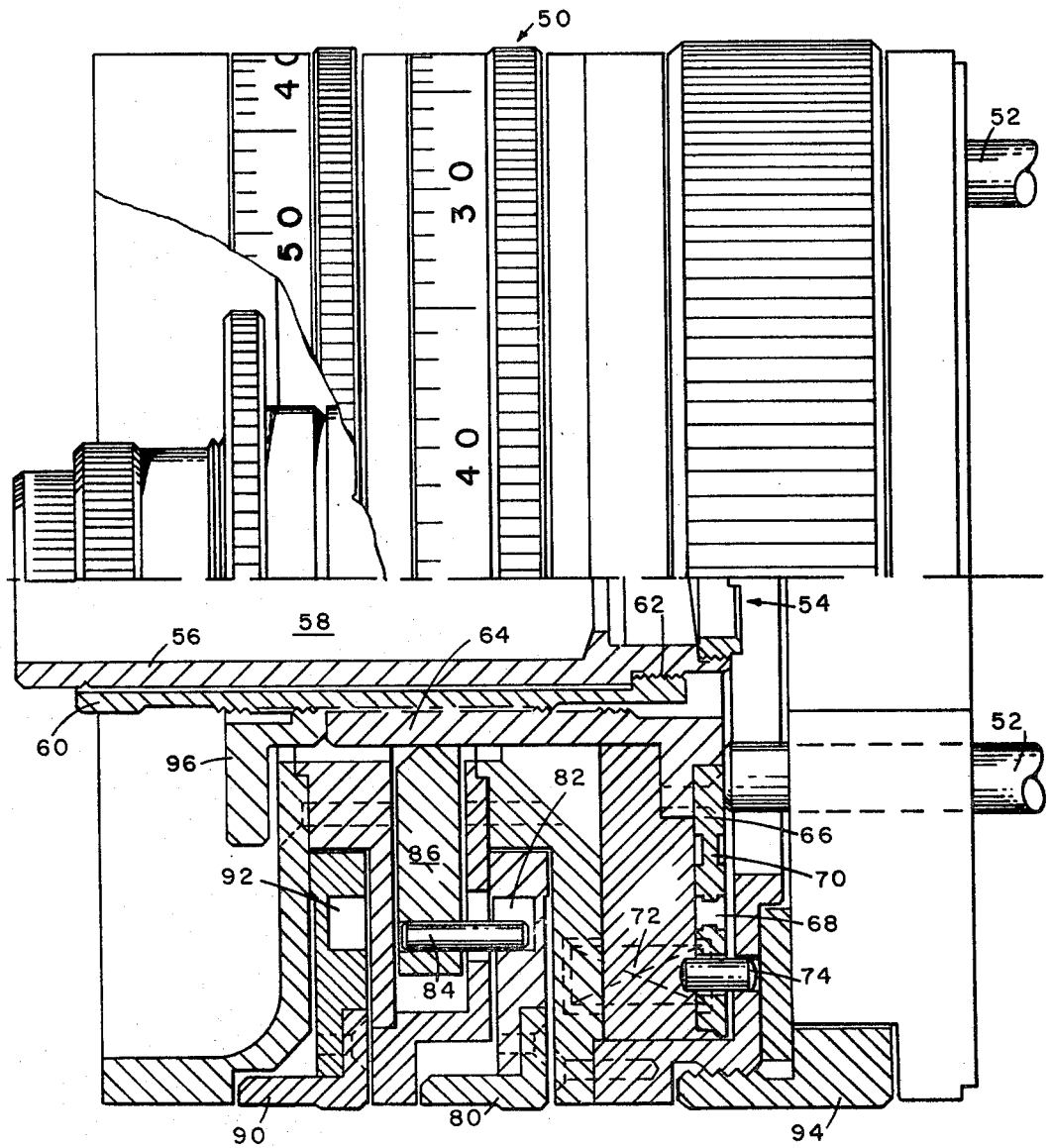

FIGURE 1 is a schematic view illustrating the interrelationship of the various components, and
FIGURE 2 is a view, partially in cross section, of a tuning device constructed according to this invention.

Detailed description

Referring to FIGURE 1, a schematic of the apparatus is shown. Shown at 2 is a mirror which is located at one end of the laser cavity, not shown. It is this mirror which must be finally positioned. Mirror 2 is supported on longitudinal member or beam 4.

Accordingly, movement of beam 4 in a plane indicated by arrow 6 will move mirror 2 in the same plane. In a similar manner, movement of beam 4 in a direction indicated by arrow 8 will move mirror 2 in a plane which is normal to the aforementioned plane. While these planes may be described as vertical and horizontal, it is obvious that these terms are meant to apply to substantially normal planes.

Beam 4 is supported by a body, not shown, through means of flexural pivot 10. This pivot comprises a spring disc having slots 12 and 14. Where slots 12 and 14 terminate, a flexural pivot point 16 on one side and another pivot point 17 on the other side is formed. While lens 2 is shown as being out of the plane of pivot 10, it is desirable that it be located in the plane of the pivot as shown in FIGURE 2.

In a similar manner, slots 18 and 20 are provided and similarly form pivot points 22 and 24 to allow movement of beam 4 in a horizontal plane.

To effectuate movement of the beam and hence mirror 2, rotatable scroll members 26 and 28 are provided, each of which has a scroll 30 and 32 respectively. Mounted on beam 4 are cam followers 34 and 36 which extend at right angles to each other and which fit in scrolls 30 and 32 respectively. Scroll members 26 and 28 restrained by means not shown except for rotation.

Since scrolls 30 and 32 extend in a spiral direction, it can be seen that rotation of discs 26 and 28 will cause bending of beam 4. Thus, when disc 26 is rotated in the direction of arrow 40, scroll 30 will bear on cam follower 34 forcing beam 4 to move upwardly in the direction of arrow 8. When disc 28 is moved in the direction of arrow 42, beam 4 will move in the direction of arrow 6.

Referring now to FIGURE 2, a view of the mirror supporting and adjusting device is shown in more detail with portions in cross section. The mirror holding device is indicated generally at 50 and is supported by Invar rods 52. These rods serve to support the assembly relative to the laser cavity and to another mirror holding assembly which, for purposes of clarity, is not shown.

The mirror itself is shown generally at 54 and is supported by mirror cell 56. Coherent emission of light will pass through mirror assembly 54 through passage or bore 58.

Mirror cell 56 is secured to an adjusting element 60 by means of threads 62. Adjusting element 60 functions to vary the laser cavity length. Members 56, 60 and beam 64 are in turn supported by means of another flexural pivot structure 66 similar to pivot 10 shown in FIGURE 1. Thus, an exterior slot 68 corresponds with slot 12 while flexural pivot point 70 corresponds with flexural pivot point 22 or 24. A spring or bias means indicated generally at 72 serves to bias pin 74 to the right so as to support pivot 66 and to bias pivot 66 to the right against the body member and Invar rod 52.

A rotatable member 80 corresponding to 26 in FIGURE 1 has a similar scroll 82 for reception of a pin 84. This pin, in turn, forces lever 86 against beam 64 to bias beam 64 either upwardly or downwardly depending upon the position of scroll 82 relative to pin 84. Upward and downward movement of beam 64, in turn, changes the position of lens 54.

In a similar manner, rotatable member 90 with scroll 92 biases a pin and lever assembly not shown (it is displaced 90°) so as to bias beam 64 in a direction either into or out of the plane of FIGURE 2.

It can be seen that the adjusting structure can be removed by rotation of member 94. A lock 96 is provided to prevent undesirable rotation of the various elements after assembly. By rotation of member 60, the axial position of mirror or lens assembly 54 can be varied.

The upper half of FIGURE 2 is illustrative of the outward appearance of the device and, as can be seen, includes indicia on the exterior of rotatable elements 80 and 90.

By using the flexural pivot, an advantage is had over conventional bearing structures. Firstly, there is maintained a bias on the lens mounting structure. In addition, there is a zero clearance due to the bending of the pivot material.

By using a relatively large diameter adjusting mechanism, it is possible to provide both a coarse and fine adjustment. It is but a simple matter to hand rotate the adjusting element a single revolution while at the same time fine adjustments are readily attainable.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as fall within the true scope of the invention.

What is claimed is:

1. A device for adjusting an object about a predetermined point which comprises:
    a longitudinal beam, said beam supporting said object;
    a first lever adapted to bear against said beam and to rotate said beam about said point in a first plane;
    a first rotatable element adapted upon rotation to actuate said first lever to bear against said beam;
    a second lever adapted to bear against said beam and to rotate said beam about said point in a second plane, said second plane being normal to said first plane;
    a second rotatable element adapted upon rotation to actuate said second lever to bear against said beam;
    a body member, said body member being adapted to support said beam, said levers and said elements.

2. A device for adjusting an object according to claim 1, wherein said beam is supported by said body member through a flexural pivot member.

3. A device for adjusting an object according to claim 1, wherein at least one of said rotatable elements includes a scroll slot, the corresponding lever having means fitting in said slot, whereby rotation of said element will move said beam in a predetermined plane about said point.

4. A device for adjusting an object according to claim 3 wherein the other of said rotatable elements includes a scroll slot, and the other lever has means fitting in said slot, whereby rotation of said other element will move said beam in a predetermined plane about said point.

References Cited

UNITED STATES PATENTS

| | | | |
|---|---|---|---|
| 3,204,471 | 9/1965 | Rempel | 74—89.15 |
| 3,242,440 | 3/1966 | Koester et al. | 330—4.3 X |
| 3,277,396 | 10/1966 | Statz et al. | 330—4.3 X |

DONLEY J. STOCKING, *Primary Examiner.*

LEONARD H. GREIN, *Assistant Examiner.*

U.S. Cl. X.R.

330—4.3; 331—94.5